US012801987B2

(12) United States Patent
Bhide et al.

(10) Patent No.: US 12,801,987 B2
(45) Date of Patent: Nov. 17, 2026

(54) CORRECTING A CLASSIFICATION MODEL

(71) Applicant: INTERNATIONAL BUSINESS MACHINES CORPORATION, Armonk, NY (US)

(72) Inventors: Manish Anand Bhide, Hyderabad (IN); Ravi Chandra Chamarthy, Hyderabad (IN); Trent A. Gray-Donald, Ottawa (CA); Remus Lazar, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 816 days.

(21) Appl. No.: 18/158,190

(22) Filed: Jan. 23, 2023

(65) Prior Publication Data

US 2024/0249187 A1 Jul. 25, 2024

(51) Int. Cl.
*G06N 20/00* (2019.01)

(52) U.S. Cl.
CPC .................................... *G06N 20/00* (2019.01)

(58) Field of Classification Search
CPC ................................................ G06N 3/02–105
See application file for complete search history.

(56) References Cited

U.S. PATENT DOCUMENTS

2020/0184350 A1* 6/2020 Bhide ...................... G06N 5/04
2021/0216720 A1* 7/2021 Rao ......................... G06F 40/35
2021/0319333 A1* 10/2021 Lee ...................... G06N 3/0499
2021/0383268 A1* 12/2021 Miroshnikov ......... G06N 20/00
2022/0076080 A1 3/2022 Hacmon et al.
2022/0164606 A1 5/2022 Chamarthy et al.
2022/0327327 A1 10/2022 Chamarthy et al.
2022/0414766 A1* 12/2022 Miroshnikov ......... G06Q 40/03
2023/0153694 A1* 5/2023 Kobayashi ............. G06N 20/00
706/12

(Continued)

OTHER PUBLICATIONS

Udeshi, Sakshi, Pryanshu Arora, and Sudipta Chattopadhyay. "Automated directed fairness testing." Proceedings of the 33rd ACM/IEEE international conference on automated software engineering. 2018. (Year: 2018).*

(Continued)

*Primary Examiner* — Liang Y Li
(74) *Attorney, Agent, or Firm* — CHIP LAW GROUP

(57) ABSTRACT

Provided are techniques for correcting a classification model. For each original record of a plurality of original records that are processed by a classification model: the original record is perturbed; for the original record, an original confidence value is obtained for each class of a plurality of classes; for the perturbed record, a perturbed confidence value is obtained for each class of the plurality of classes; a final confidence value is determined using each original confidence value, each perturbed confidence value, and a direction of distance travelled; and a determination is made of whether the original record is biased based on the final confidence value. Then, it is determined whether the classification model is biased based on the original records that are determined to be biased. In response to determining that the classification model is biased, the classification model is corrected, otherwise, the classification model is deployed.

20 Claims, 14 Drawing Sheets

(56) References Cited

U.S. PATENT DOCUMENTS

2023/0154235 A1* 5/2023 Zhao ........................ G06N 3/09
382/118

OTHER PUBLICATIONS

A. Zewe, "A technique to improve both fairness and accuracy in artificial intelligence", MIT News Office, Jul. 20, 2022, 4 pp.

"Method to Identify the Single or Combination of Dimensions in a Latent Factor Contributing to Biasing in AI Explainable AI Platform Services", ip.com, IP.com No. IPCOM000270362D, Jul. 1, 2022, 6pp.

C. Agarwal, et al., "Towards a Unified Framework for Fair and Stable Graph Representation Learning", Proceedings of Machine Learning Research, Proceedings of the Thirty-Seventh Conference on Uncertainty of Artificial Intelligence, 2021, 2pp.

"Evaluating AI Models with Watson OpenScale", IBM Corporation, IBM Cloud Pak for Data, Nov. 29, 2022, 3 pp.

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

* cited by examiner

300

$$\frac{\text{Ratio of favorable outcome of Compare group}}{\text{Ratio of favorable outcome of Reference group}} < 0.8$$

FIG. 3

400

Example Scenario:
Users in age range [18,25] have Poor Credit Rating
% favorable outcome for age range [18,25] (Compare group) = 0%
% favorable outcome for Reference group = 40%
Disparate Impact Ratio = 0

410

Data Perturbation:
Original Data: Age = 20, Credit Rating = Poor, Prediction= Loan Denied
Perturbed Data: Age = 45, Credit Rating = Poor, Prediction = Loan Denied
Original Data: Age = 50, Credit Rating = Good, Prediction = Loan Approved
Perturbed Data: Age = 22, Credit Rating = Good, Prediction = Loan Approved

FIG. 4

500

Model Data:
Compare group: Education Level = Second Entity Type
Reference group: Education Level = First Entity Type
Favorable outcome = Loan approved
Unfavorable outcome = Loan denied

510

First Example Scenario:
Original record: Education Level = First Entity Type, Prediction = Loan approved
Perturbed record: Education Level = Second Entity Type, Prediction = Loan denied

520

Second Example Scenario:
Original record: Education Level = First Entity Type, Prediction = Loan approved, Confidence Value = 0.9
Perturbed record: Education Level = Second Entity Type, Prediction = Loan approved, Confidence Value = 0.51

FIG. 5

600

Case 1: Hidden Bias
Second Entity Type – Approved/Denied :: 0.2/0.8 = 0.25, Prediction = Loan Denied
First Entity Type – Approved/Denied :: 0.4/0.6 = 0.67, Prediction = Loan Denied

610

Case 2: Overt Bias
Second Entity Type – Approved/Denied :: 0.2/0.8 = 0.25 Prediction = Loan Denied
First Entity Type – Approved/Denied :: 0.6/0.4 = 1.5 Prediction = Loan Approved

620

Case 3: Not Biased
Second Entity Type – Approved/Denied :: 0.2/0.8 = 0.25, Prediction = Loan Denied
First Entity Type – Approved/Denied :: 0.1/0.9 = 0.11, Prediction = Loan Denied

FIG. 6

Case 1: Hidden Bias
Second Entity Type – Approved/Denied :: 0.2/0.8 Prediction = Loan Denied
First Entity Type – Approved/Denied :: 0.4/0.6 Prediction = Loan Denied
First distance: |0.8 - 0.2| = 0.6. Second distance: |0.6 - 0.4| = 0.2
Change in distance: 0.6 - 0.2 = 0.4

700

Case 2: Overt Bias
Second Entity Type – Approved/Denied :: 0.2/0.8 Prediction = Loan Denied
First Entity Type – Approved/Denied :: 0.6/0.4 Prediction = Loan Approved
First distance: |0.8 - 0.2| = 0.6, Second distance: |0.6 - 0.4| = 0.2
Change in distance: |0.6 - 0.2| = 0.4

710

FIG. 7

Case 1: Hidden Bias
Second Entity Type – Approved/Denied :: 0.2/0.8 Prediction = Loan Denied
First Entity Type – Approved/Denied :: 0.4/0.6 Prediction = Loan Denied
Distance travelled: (0.4 - 0.2)+(0.6 - 0.8) = 0.2 - 0.2 = 0

800

Case 2: Overt Bias
Second Entity Type – Approved/Denied :: 0.2/0.8 Prediction = Loan Denied
First Entity Type – Approved/Denied :: 0.6/0.4 Prediction = Loan Approved
Distance travelled: (0.2 - 0.6)+(0.8 - 0.4) = -0.4+0.4 = 0

810

FIG. 8

<u>Case 2: Overt Bias</u>
Second Entity Type – Approved/Denied :: 0.2/0.8
First Entity Type – Approved/Denied :: 0.6/0.4
Absolute Distance travelled: |0.6 - 0.2|+|0.4 - 0.8| = 0.4+0.4 = 0.8

910

<u>Case 3: Not Biased</u>
Second Entity Type – Approved/Denied :: 0.2/0.8
First Entity Type – Approved/Denied :: 0.1/0.9
Classification model is not biased.
Absolute distance travelled = |0.1 - 0.2|+|0.9 - 0.8| = 0.1+0.1 = 0.2

920

FIG. 9

Case 1: Hidden Bias
Second Entity Type – Approved/Denied :: 0.2/0.8
First Entity Type – Approved/Denied :: 0.4/0.6
Direction based distance:
Confidence change from 0.2 to 0.4 is increasing bias. Find absolute difference and treat as positive. 1000
Confidence change from 0.8 to 0.6 is increasing bias. Find absolute difference and treat as positive.
0.4-0.2+0.8-0.6 = 0.4

Case 2: Overt Bias
Second Entity Type – Approved/Denied :: 0.2/0.8
First Entity Type – Approved/Denied :: 0.6/0.4
Direction based distance:
Confidence change from 0.2 to 0.6 is increasing bias. Find absolute difference and treat as positive. 1010
Confidence change from 0.8 to 0.4 is increasing bias. Find absolute difference and treat as positive.
0.6-0.2+0.8-0.4 = 0.8

Case 3: Not biased
Second Entity Type – Approved/Denied :: 0.2/0.8
First Entity Type – Approved/Denied :: 0.1/0.9
Direction based distance:
Confidence change from 0.2 to 0.1 is reducing bias. Find absolute difference and treat as negative. 1020
Confidence change from 0.8 to 0.9 is reducing bias. Find absolute difference and treat as negative.
-0.1-0.1 = -0.2

Case 4: Another case where the classification model is not biased:
Second Entity Type – Approved/Denied :: 0.6/0.4 Prediction: Loan Approved.
First Entity Type – Approved/Denied :: 0.2/0.8 Prediction: Loan Denied
Direction based distance:
Confidence change from 0.6 to 0.2 is reducing bias. Find absolute difference and treat as negative. 1030
Confidence change from 0.4 to 0.8 is reducing bias. Find absolute difference and treat as negative.
-0.4-0.4 = -0.8

FIG. 10

FIG. 11

1100

Example Scenario:
Favorable: C1/C2
Unfavorable: C3/C4
Original: C1/C2/C3/C4 :: 0.5/0.2/0.25/0.05 Prediction: Favorable | First Entity Type
Perturbed: C1/C2/C3/C4 :: 0.5/0.01/0.25/0.24 Prediction: Favorable | Second Entity Type
For C1 there is no change in confidence.
For C2 confidence drops from 0.2 to 0.01.
For C3 there is no change in confidence.
For C4 confidence increases from 0.05 to 0.24.

FIG. 12

1200

Example Scenario:
Original: C1/C2/C3/C4 :: 0.5/0.2/0.25/0.05 Prediction: Favorable | First Entity Type
Perturbed: C1/C2/C3/C4 :: 0.5/0.01/0.25/0.24 Prediction: Favorable | Second Entity Type Direction based distance for classes
For C1 there is no change in confidence.
For C2 confidence changes from 0.2 to 0.01 and is increasing bias. Find absolute difference and treat as positive.
For C3 there is no change in confidence.
For C4 confidence changes from 0.05 to 0.24 and is increasing bias. Find absolute difference and treat as positive.
= (0.5-0.5)+(0.2-0.01)+(0.25-0.25)+(0.24-0.05) = 0.19+0.19 = 0.38

CORRECTING A CLASSIFICATION MODEL

BACKGROUND

Embodiments of the invention relate to correcting a classification model. In particular, embodiments of the invention relate to measuring fairness of the classification model and correcting the classification model to improve fairness.

A classification model may be described as machine learning techniques that emulate logical decision-making based on data. Fairness of a classification model may be described as an indication of whether different groups are treated similarly under similar conditions.

There are several metrics to measure the fairness of classification models. They are classified into the following categories: a parity metric, an equality of opportunity metric, an equality of odds metric, and a bounded error loss metric. The parity metric is more commonly used and may be implemented as a disparate impact ratio metric or a statistical parity difference metric. These metrics are used to look at the model behavior and convert that into either a favorable outcome or an unfavorable outcome. The metrics are then used to determine whether the classification model is biased ("unfair"). However, existing metrics may not be accurate across difference scenarios.

SUMMARY

In accordance with certain embodiments, a computer-implemented method is provided for correcting a classification model by performing operations. For each original record of a plurality of original records of a data set that are processed by a classification model: the original record is perturbed to generate a perturbed record; for the original record, an original confidence value is obtained for each class of a plurality of classes for an outcome; for the perturbed record, a perturbed confidence value is obtained for each class of the plurality of classes for the outcome; a final confidence value is determined using each original confidence value, using each perturbed confidence value, and using a direction of distance travelled; and it is determined whether the original record is biased based on the final confidence value. Then, it is determined whether the classification model is biased based on how many original records are determined to be biased. In response to determining that the classification model is biased, the classification model is corrected. In response to determining that the classification model is not biased, the classification model is deployed.

In accordance with other embodiments, a computer program product is provided for correcting a classification model. The computer program product comprises a computer readable storage medium having program code embodied therewith, the program code executable by at least one processor to perform operations. For each original record of a plurality of original records of a data set that are processed by a classification model: the original record is perturbed to generate a perturbed record; for the original record, an original confidence value is obtained for each class of a plurality of classes for an outcome; for the perturbed record, a perturbed confidence value is obtained for each class of the plurality of classes for the outcome; a final confidence value is determined using each original confidence value, using each perturbed confidence value, and using a direction of distance travelled; and it is determined whether the original record is biased based on the final confidence value. Then, it is determined whether the classification model is biased based on how many original records are determined to be biased. In response to determining that the classification model is biased, the classification model is corrected. In response to determining that the classification model is not biased, the classification model is deployed.

In accordance with yet other embodiments, a computer system is provided for correcting a classification model. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. For each original record of a plurality of original records of a data set that are processed by a classification model: the original record is perturbed to generate a perturbed record; for the original record, an original confidence value is obtained for each class of a plurality of classes for an outcome; for the perturbed record, a perturbed confidence value is obtained for each class of the plurality of classes for the outcome; a final confidence value is determined using each original confidence value, using each perturbed confidence value, and using a direction of distance travelled; and it is determined whether the original record is biased based on the final confidence value. Then, it is determined whether the classification model is biased based on how many original records are determined to be biased. In response to determining that the classification model is biased, the classification model is corrected. In response to determining that the classification model is not biased, the classification model is deployed.

Thus, embodiments advantageously provide a new technique for determining the bias of a classification model using confidence values and direction of distance travelled. This provides for a more accurate determination of whether the classification model is biased. In addition, embodiments re-train the classification model to avoid bias.

In accordance with some embodiments, for each original record and each perturbed record, a confidence change between the original record and the perturbed record for a class is determined. In response to determining that bias is increasing, the confidence change is treated as a positive value. In response to determining that the bias is decreasing, the confidence change is treated as a negative value. Embodiments advantageously use the direction of change to determine whether the confidence change is treated as positive or negative.

In accordance with some embodiments, the original record is determined to be biased when the final confidence value is equal to or below a record confidence threshold. Embodiments advantageously use the record confidence threshold, which may be modified.

In accordance with some embodiments, the classification model is determined to be biased when a number of the original records exceeds a model bias threshold. Embodiments advantageously use the model bias threshold, which may be modified.

In accordance with some embodiments, in response to determining whether the original record is biased, the original record is labelled as biased. Embodiments advantageously label biased records to enable them to be identified for re-training the classification model.

In accordance with some embodiments, the classification model is re-trained using each original record labelled as biased. Embodiments advantageously use the biased records to perform re-training of the classification model, and this focuses the re-training.

In accordance with some embodiments, the classification model is one of a binary classification model and a multi-class classification model. Embodiments advantageously apply to binary and multi-class classification models.

BRIEF DESCRIPTION OF THE SEVERAL VIEWS OF THE DRAWINGS

Referring now to the drawings in which like reference numbers represent corresponding parts throughout:

FIG. 3 illustrates a disparate impact ratio in accordance with certain embodiments.

FIG. 4 illustrates an example scenario with perturbation in accordance with certain embodiments.

FIG. 5 illustrates example scenarios to show how use of confidence values impact model fairness in accordance with certain embodiments.

FIG. 6 illustrates example cases with ratios of approved/denied in accordance with certain embodiments.

FIG. 7 illustrates a change in distance approach in accordance with certain embodiments.

FIG. 8 illustrates a distance travelled approach in accordance with certain embodiments.

FIG. 9 illustrates an absolute distance travelled approach in accordance with certain embodiments.

FIG. 10 illustrates a direction of distance travelled approach in accordance with certain embodiments.

FIG. 11 illustrates multi-class classification in accordance with certain embodiments.

FIG. 12 illustrates multi-class classification with direction of distance approach in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
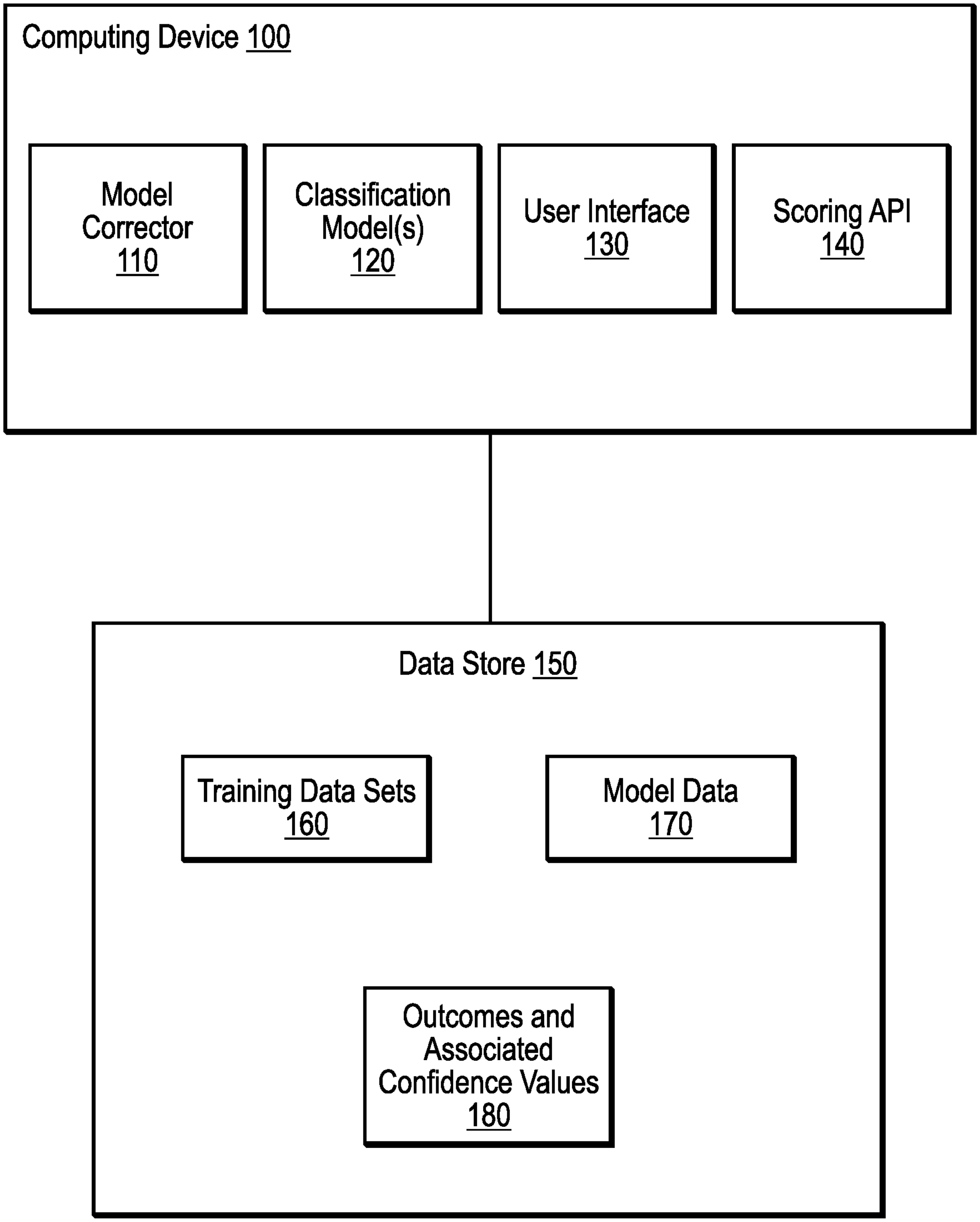
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is connected to a data store 150. The computing device 100 includes a model corrector 110, one or more classification models 120, a user interface 130, and a scoring Application Programming Interface (API) 140. The data store 150 stores training data sets 160, model data 170, and outcomes and associated confidence values 180. A training data set 160 may be said to have records with features (e.g., education level, gender, age, etc.).

An outcome may also be referred to as a prediction, a predicted outcome, a model outcome or a model predicted outcome. With embodiments, the possible values of the outcome may be described as classes, outcome values or outcomes (e.g., first outcome, second outcome, etc.). The confidence values are associated with the classes ("outcome values") of the outcome.

The classification model 120 may also be referred to as an Artificial Intelligence (AI) model, a machine learning model, a neural network, etc. With embodiments, the classification model 120 is a binary classification model or a multi-class classification model. With embodiments, since classes refer to possible values of an outcome, a binary classification model may have two classes for the outcome, while a multi-class classification model has more than two classes for the outcome. For example, for a binary classification model, the outcome may be loan approved or loan rejected, where loan approved and loan rejected are the two (binary) classes. As another example, for a multi-class classification model, the outcome may be loan approved, loan partially approved or loan rejected, where loan approved, loan partially approved or loan rejected are the multiple classes. Continuing with these examples, out of these classes, loan approved and loan partially approved may be considered to be a favorable class, while loan rejected may be considered to be an unfavorable class. With various embodiments, the favorable and unfavorable classes change based on the outcome that the classification model is predicting.

The model corrector 110 determines the fairness score of a classification model 120 and, based on the fairness score being below a fairness threshold, corrects the classification model 120. The fairness score is calculated by comparing a reference group (also referred to as a first group, a majority group or a baseline group) to a compare group (also referred to as a second group, a minority group or a monitored group).

In certain embodiments, the confidence value describes how confidently the classification model 120 predicts the outcome. For example, for a given loan application, if the classification model 120 predicted the outcome as loan approved with a confidence value of 90%, then, the classification model 120 is 90% confident in predicting the outcome as loan approved.

In certain embodiments, the fairness score describes how well the classification model 120 is making fair (unbiased) decisions between various groups of the features selected for comparison. For example, consider a case in which the classification model 120 has received 100 loan applications by 60 first entity types (e.g., college graduates) and 40 second entity types (e.g., high school graduates). For the 60 first entity types, the classification model 120 predicted a favorable outcome for 55 first entity types, while the classification model 120 predicted a favorable outcome for 40 second entity types. In certain embodiments, the model corrector 110 determines the fairness score using disparate impact ratio using the following ratio: ratio of favorable outcomes of compare group/ratio of favorable outcomes for reference group. Continuing with this example, the model corrector 110 compares fairness for second entity types (the compare group) with reference to first entity types (the reference group). The model corrector 110 determines the confidence value ratio of 20/40 for the compare (second entity type) group and determines the confidence value ratio of 55/60 for the reference (first entity type) group. Then, the model corrector 110 generates the fairness score using these confidence value ratios as follows:

$$(20/40)/(55/60)=0.54.$$

That is, the fairness score is 54%.

In certain embodiments, the model corrector 110 may be provided as a model corrector API that may be invoked to generate a fairness score for a classification model 120 and correct that classification model 120 based on the fairness score. In certain embodiments, correcting the classification model 120 refers to re-training the classification model 120 so that the fairness score exceeds a fairness threshold (also referred to as a fairness alert threshold). For example, if the fairness score is 54%, and the fairness threshold is 80% (meaning that at least 80% of the second entity types get a favorable outcome as compared to first entity types), then the model corrector 110 re-trains the classification model 120 so that the fairness score exceeds the fairness threshold, so that the classification model 120 behaves in a fair manner.

In certain embodiments, the model corrector 110 calls the scoring API 140 to generate a confidence value.

In certain embodiments, the model data 170 includes features to be used in determining fairness, a reference group and a compare group, a fairness threshold, favorable and unfavorable outcomes, etc.

The model corrector 110 measures fairness of classification models using confidence values (also referred to as "model confidence values"). The model corrector 110, for a binary classification model, perturbs the input data and the sum of the difference in the confidence values is used as a measure of the fairness of the classification model. The model corrector 110 uses a direction of the distance travelled approach for a binary classification model, where, if direction increases bias, the confidence change (absolute difference of confidence values) is treated as positive, and, if the direction decreases bias, the confidence change is treated as negative. The model corrector 110 uses a direction of the distance travelled approach for a multi-class classification model, where the sum of distance travelled for confidence values for the classes is used as a measure of fairness of the classification model. The model corrector 110 uses the direction of the change in confidence values to decide whether the confidence change is to be treated as positive or negative.

Figure 2A:
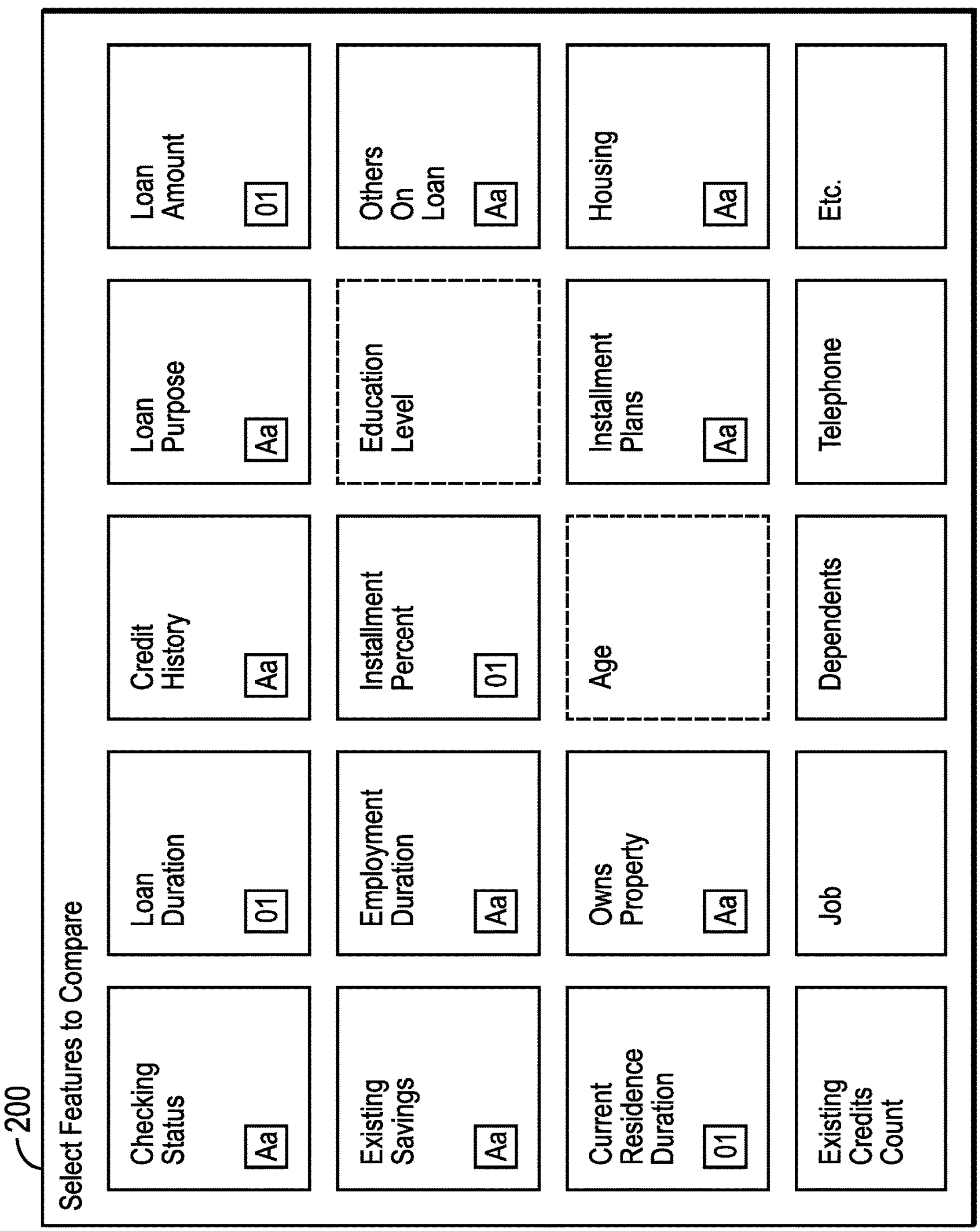
FIGS. 2A, 2B, 2C, 2D illustrate example user interfaces that receive model data in accordance with certain embodiments.
Figure 2B:
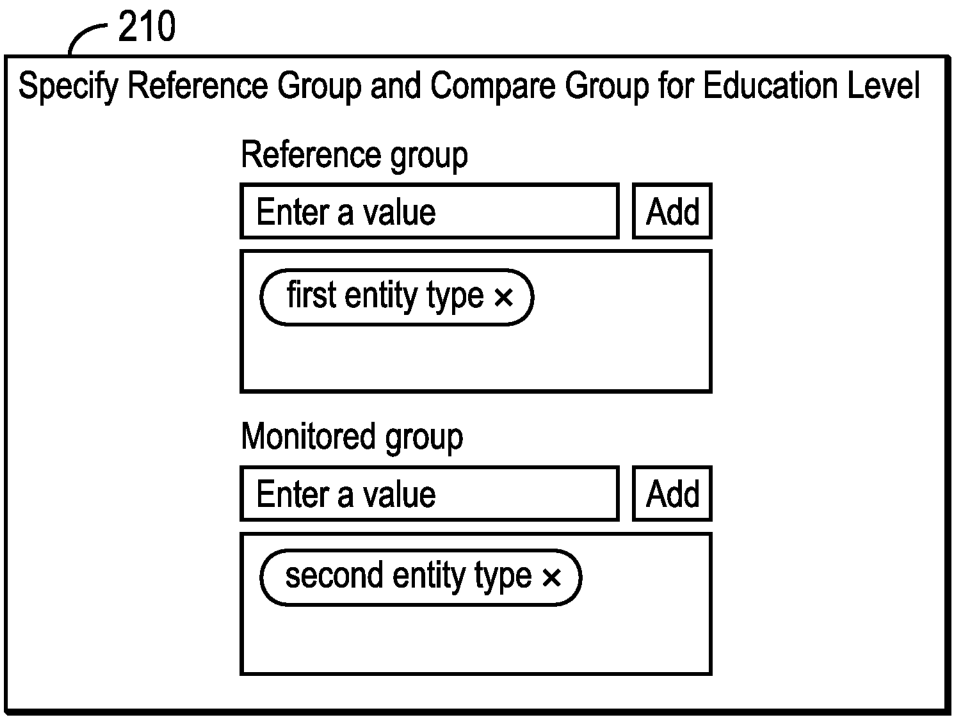

FIGS. 2A, 2B, 2C, 2D illustrate example user interfaces that receive model data in accordance with certain embodiments. The user interface of FIGS. 2A and 2B is an example of user interface 130. In FIG. 2A, user interface 200 receives selection of the features: education level (e.g., first entity type or second entity type) and age. In various embodiments, any combination of features may be selected. For each feature selected, the model corrector 110 determines a model's propensity for a favorable outcome for one feature over the other feature. With embodiments, the features may be monitored individually, and debiasing may correct issues for the features together. These are the features of a training data set 160 that the model corrector 110 is using to train a classification model 120.

In FIG. 2B, user interface 210 receives reference group selection of first entity type and compare group selection of second entity type. With embodiments, the values of the training data set 160 are divided into two groups—the reference group and the compare group. The reference group values are used to calculate disparities of outcomes between the groups. The compare group values are compared with the reference group values to check for potential bias of the classification model 120.

Figure 2C:
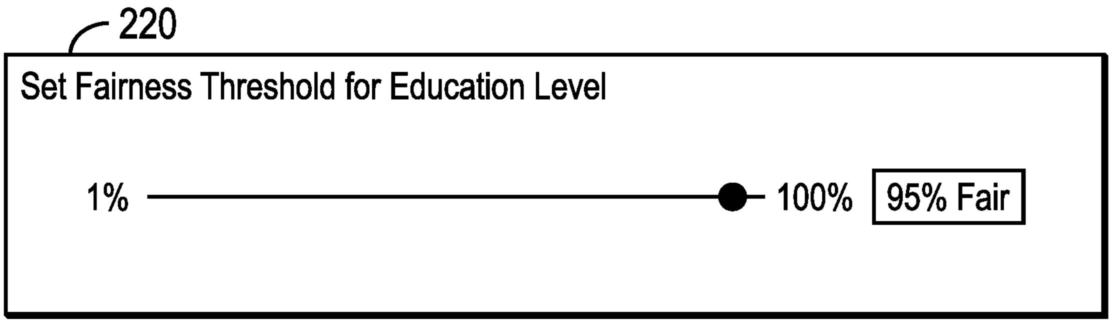

In FIG. 2C, user interface 220 receives selection of the fairness threshold of 95%. The model corrector 110 may correct the classification model 120 when the fairness score of the classification model 120 falls below the fairness threshold. The model corrector 110 may also send (or display) an indication (e.g., to a system administrator) when the fairness score of the classification model 120 falls below the fairness threshold.

Figure 2D:
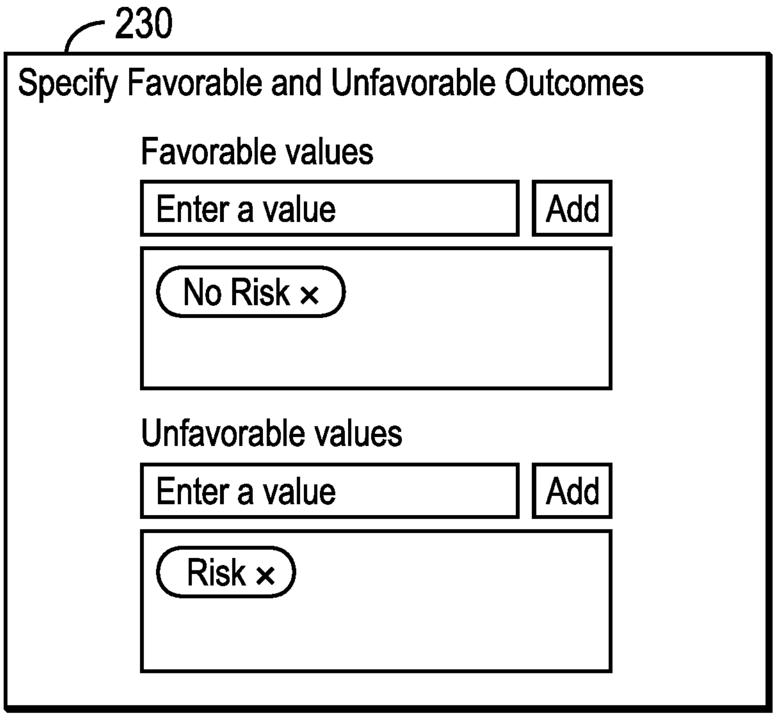

In FIG. 2D, user interface 230 receives selection of a favorable outcome of no risk and an unfavorable outcome of risk. The model corrector 110 calculates the percentage of records in the training data set 160 that receive the predicted outcomes specified.

Merely to enhance understanding, examples of classification models that predict whether a person is to get a loan or not will be discussed.

In one example, 30% of second entity types get home loans approved, whereas 65% of first entity types get home loans approved, resulting in a disparate impact ratio of 0.46 which is less than the fairness threshold of 0.8. Continuing with this example, if the ratio of the home loans given to people with age<25 is very different from that for age>=25, then the disparate impact ratio may be higher than the fairness threshold. FIG. 3 illustrates the disparate impact ratio 300 in accordance with certain embodiments. In FIG. 3, the disparate impact ratio 300 is the ratio of the favorable outcomes for the compare group (second entity type) to the favorable outcomes for the reference group (first entity type). In this example, 80% of second entity types should get loans with reference to first entity types.

FIG. 4 illustrates an example scenario 400 with perturbation 410 in accordance with certain embodiments. In FIG. 4, for each original record, the age is changed (perturbed). In the example scenario 400, the disparate impact ratio is zero ("0"), which indicates that the classification model is biased. In perturbation 410, the "Prediction" is the outcome and indicates a class of Loan Denied or a class of Loan Approved.

FIG. 5 illustrates additional example scenarios 510, 520 to show how use of confidence values impact model fairness in accordance with certain embodiments. The model data 500 provides the groups and outcomes. In the first example scenario 510, confidence values are not included for the original record and the perturbed record, the disparate impact ratio is low, and the classification model is considered biased. In the second example scenario 520, confidence values of 0.9 and 0.51 are included for the original record and the perturbed record. In this case, the disparate impact ratio is not impacted, and the classification model is considered to be fair.

The confidence values may be described as a probability that the classification model predicted the correct outcome. For example, the confidence value of 0.9 indicates a 90% probability that the predicted outcome is correct, while the confidence value of 0.51 indicates a 51% probability that the predicted outcome is correct.

In the example scenario 510, a first entity type applicant applies for a loan, and the classification model outputs that the loan is approved. Next, the record for the first entity type is perturbed by switching the education level from first entity type to second entity type and sending the record back to the classification model. If the classification model predicts that the loan is denied, then the classification model may be flagged as being biased. In the example scenario 520, in which the classification model predicted outcome does not change from that of example scenario 510, however, the confidence value for the class Loan approved changes from 0.95 (for first entity type) to 0.51 (for second entity type), then, the classification model is susceptible to bias, but is not flagged as being biased because the confidence value did not drop below 0.5 (with 0.5 being the fairness threshold).

FIG. 6 illustrates example cases 600, 610, 620 with ratios of approved/denied in accordance with certain embodiments. Case_1 600 is an example of hidden bias, case_2 610 is an example of overt bias, and case_3 620 is an example of no bias.

In case_1 600, for a second entity type, the ratio is approved/denied 0.2/0.8=0.25, while for a first entity type, the ratio is approved/denied 0.4/0.6=0.67. In case_1 600, the classification model has a higher confidence value to approve a loan for a first entity type (0.4 confidence value) than a second entity type (0.2 confidence value), however, the confidence value of 0.4 for the first entity type is below 0.5. Therefore, the classification model is biased, but is not reported as biased based on standard metrics, such as the disparate impact ratio metric. In case_2 610, for a second entity type, the ratio is 02/0.8, while for a first entity type, the ratio is 0.6/0.4. In case 2 610, the classification model is more biased than in case_1 and is reported as biased based on standard metrics, such as the disparate impact ratio metric. In case_3 620, for a second entity type, the ratio is 0.2/0.8, while for a first entity type, the ratio is 0.1/0.9. In case_3 620, the classification model is reported as fair based on standard metrics, such as the disparate impact ratio metric.

FIG. 7 illustrates a change in distance approach in accordance with certain embodiments. The change in distance approach measures a change in distance between confidence values of the approved (favorable) and denied (unfavorable) outcomes using absolute values. In particular, the change in distance approach determines a first absolute distance with the approved confidence value and the denied confidence value for a second entity type, determines a second absolute distance with the approved confidence value and the denied confidence value for a first entity type, and determines the change in distance by subtracting the second distance from the first distance. For example, with reference to case_1 700, the change in distance is: 0.6−0.2=0.4, where the first distance is 0.8−0.2=0.6, and the second distance is 0.6−0.4=0.2. With reference to case_2 710, the change in distance is: 0.6−0.2=0.4, where second entity type/first distance is 0.8−0.2=0.6, and the first entity type/second distance is the absolute value of 0.6−0.4=0.2. Thus, even though the classification model of case_2 710 is more biased than the classification model of case_1 700, both have the same distance of 0.2.

FIG. 8 illustrates a distance travelled approach in accordance with certain embodiments. The distance travelled approach measures determines a first value with the confidence value for approved for a second entity type and the confidence value for approved for a first entity type, determines a second value with the confidence value for denied for the second entity type and the confidence value for denied for the first entity type, and determines the distance travelled by adding the first value and the second value. For example, with reference to case_1 800, the distance traveled is zero, and with reference to case_2 810, the distance travelled is also zero. Thus, even though the classification model of case_2 810 is more biased than the classification model of case_1 800, both have the same distance traveled of 0.

FIG. 9 illustrates an absolute distance travelled approach in accordance with certain embodiments. The absolute distance travelled approach uses absolute values. The absolute distance travelled approach determines a first absolute value with the confidence value for approved for a second entity type and the confidence value for approved for a first entity type, determines a second absolute value with the confidence value for denied for the second entity type and the confidence value for denied for the first entity type, and determines the absolute distance travelled by adding the first value and the second value. For example, with reference to case_2 910, the absolute distance traveled is 0.8 and indicates bias, and with reference to case_3 912, the absolute distance travelled is 0.2. This shows that the classification model of case_3 920 is biased, even though it is not biased.

FIG. 10 illustrates a direction of distance travelled approach in accordance with certain embodiments. The direction of distance travelled approach determines a first absolute value with the confidence value for approved for a second entity type and the confidence value for approved for a first entity type, determines a second absolute value with the confidence value for denied for the second entity type and the confidence value for denied for the first entity type, and determines the direction of distance travelled by adding the first value and the second value. If the direction of travel is leading to an increase in bias, the model corrector 110 considers the direction to be positive, otherwise, the model corrector 110 considers the direction to be negative. For example, with reference to case_1 1000, the direction of distance travelled has a result of 0.4, which indicates bias. With reference to case_2 1010, the direction of distance travelled has a result of 0.8, which indicates more bias than case_1 1010. With reference to case_3 1020, the direction of distance travelled has a result of −0.02, and a negative value means there is no bias. With reference to case_4 1030, the direction of distance travelled has a result of 0.8, which indicates that there is bias. Thus, the direction of distance travelled approach best determined bias in the cases discussed.

Thus, the model corrector 110 provides a new mechanism to detect whether the classification model is predicting biased outcomes or not. In particular, the model corrector 110 uses the direction of distance travelled approach using the confidence of the predicted outcomes that the classification model has made. In certain embodiments, once the model corrector 110 obtains an indication of whether each of the records is biased, the model corrector 110 labels these records to indicate the bias. In certain embodiments, the model corrector 110 re-trains the classification model using these labelled records. In certain other embodiments, the model corrector 110 re-trains the classification model using these labelled records that are biased, as well as, other records (which may not be labelled (e.g., because they have not been used to train the classification model yet or because they are biased).

For example, consider a case in which the classification model 120 has received 100 loan application records, with 60 records for first entity types and 40 records for second entity types. Using the direction of distance travelled approach using confidence of the predicted outcomes, the model corrector 110 determines that the classification model has made 20 unfair or biased predicted outcomes for 5 first entity types and 15 second entity types. These 20 records are then labelled as "biased". Then, the model corrector 110 re-trains the classification model using these biased records so that the classification model becomes trained to make more fair predicted outcomes.

FIG. 11 illustrates a multi-class classification approach in accordance with certain embodiments. The multi-class classification approach looks at the maximum confidence values of favorable (approved) and unfavorable (denied) outcomes. The problem of multi-class classification is similar the problem of binary classification. With reference to example scenario 1100, there is a confidence value change of class C2 and C4. C2 (favorable) dropped from 0.2 to 0.01, while C4 (unfavorable) increased from 0.05 to 0.24. This indicates that the classification model is increasing the confidence value of giving an unfavorable outcome to the compare group. However, there is no change in the maximum confidence values from the set of confidence values of favorable (0.5) and unfavorable (0.25). Thus, the multi-class classification approach does not align with the bias indication.

FIG. 12 illustrates multi-class classification with direction of distance approach in accordance with certain embodiments. In the example scenario 1200, the direction based distance for the multiple classes is 0.38, which indicates bias. This factors in changes in the classes and measures bias in the classification model.

As another example of confidence value based model fairness for multi-class classification models, consider a classification model that may make one of the following predicted outcomes:

Loan approved (favorable outcome)

Loan partially approved (favorable outcome)

Loan rejected (unfavorable outcome)

In this example, a classification model has been built (e.g., by a data scientist), and the fairness of the classification model is measured using confidence value based model fairness. The model corrector 110 receives a training data set (test data), the model scoring API, and the model data (e.g., favorable/unfavorable outcomes, fairness attributes, etc.). In this example, the goal is to make sure the classification model is being fair to the compare group (second entity type) as compared to the reference group (first entity type).

In certain embodiments, to compute the confidence values, the model corrector 110 uses the scoring API 140 to score the classification model against the test data set to generate the confidence value. The model corrector 110 returns the confidence value of the predicted outcome for each of the three classes (loan approved, loan partially approved, and loan rejected). The model corrector 110 perturbs each record in the test data. In particular, if the record is for a first entity type, the model corrector 110 changes the education level from first entity type to second entity type and send the perturbed record to the classification model. The model corrector 110 receives and stores the predicted outcome and the confidence value for each of the three classes for the perturbed record. If the record is for a second entity type, the model corrector 110 changes the education level to a random reference group education level and sends the perturbed record to the model. The model corrector 110 stores the predicted outcome and the confidence value for each of the three classes for the perturbed record. The model corrector 110 computes the change in confidence values of the classes using a direction of distance approach to find the fairness.

The distance traveled based approach takes into account the total distance travelled with reference to the confidence values. For example, for the original record predicted outcome, the favorable class C1 has a confidence value of 0.7, and the confidence values of the other classes are: C2 (0.15), C3 (0.1) and C4 (0.05). For the perturbed record predicted outcome, there are two possible scenarios. In one scenario for the perturbed record, the predicted outcome is still favorable C1 with a confidence value of 0.6. In this example, the unfavorable class with the maximum (highest) confidence values is class C4 with a confidence value of 0.25. Continuing with this example, class C1 travels from 0.7 to 0.6=0.1. Class C4 travels from 0.05 to 0.25=0.2. Then, the total distance travelled is 0.3, which is a measure of fairness of the classification model. In the other scenario for the perturbed record, the predicted outcome changes to unfavorable. In this other example, class C3 has confidence value 0.9, and class C1 is the favorable class with max confidence value of 0.05. Continuing with this other example, class C3 travels from 0.1 to 0.9=0.8. Class C1 travels from 0.7 to 0.05=0.65. Then, the total distance travelled is: 0.8+0.65=1.45, which is a measure of fairness of the classification model.

With another approach, class C3 and class C4 are both unfavorable classes. The original record has confidence values of: C3 0.2, C4 0.01. The perturbed record has confidence values of: C3 0.1, C4 0.25. The unfavorable max confidence changed from 0.2 to 0.25. However, class C4 changed from 0.01 to 0.25 in distance, which indicates that the classification model is susceptible to bias.

Another approach to measure fairness is to look at how close the favorable and unfavorable classes are in terms of confidence values in the original data and how that distance changed in the perturbed record. For example, the original record as confidence values of: C1 0.7, C2 0.2, C3, 0.05, C4 0.05, and the distance is: 0.7–0.05=0.65. The perturbed record has confidence values of: C1 0.05 C2 0.05 C3 0.7 C4 0.2, and the new distance is: 0.7–0.05=0.65. This results in a change of distance of zero.

Embodiments factor in the direction in which the confidence value is changing. For example, before perturbation for a first entity type, the confidence value is C1=0.8 (favorabl— loan approved) and C2=0.2 (unfavorable), then, after perturbation to second entity type, the confidence value is C1=0.9 and C2=0.1. The distance travelled, using absolute confidence values, is 0.1+0.1=0.2, and bias has been decreased. On the other hand. If, after perturbation, the confidence values are C1=0.7, C2=0.3, the distance travelled is still 0.2, but bias has been increased.

With embodiments, if the distance traveled is towards the opposite class, then the distance traveled is considered negative. If the distance travelled is away from the opposite class (favorable/unfavorable), then the distance traveled is considered positive. In certain embodiments, the model corrector 110 finds the distance travelled for each class and then averages the distance across the data points to find an overall directional confidence value based fairness metric.

In certain embodiments, the model corrector 110 uses a non-perturbation confidence value based metric. The number of records in the test data may be very large. In that case, the model corrector 110 may not perturb and score the records. Instead, the model corrector 110 measure confidence value based fairness in a different manner. In particular, the model corrector 110 scores each record in the test data and finds the confidence value for each class. In this example, the confidence values for the classes are: C1=0.7, C2=0.2, C3=0.1. For multi-class classification, the model corrector 110 finds the difference in confidence values of the top class and the class belonging to the opposite category. For example, if the class having the highest confidence value is favorable outcome, then the model corrector finds the class belonging to the unfavorable class with the highest confidence value and finds the difference between these two highest confidence values. This difference may be described as the measure of uncertainty of the classification model to decide between the favorable and unfavorable classes.

In certain embodiments, for a binary classification model, the model corrector 110 finds two values: the distance of the winning class confidence value from the fairness threshold (e.g., 0.5) and the distance of the other class from the fairness threshold. The minimum of the two values is used as measure of the fairness based on confidence values.

In certain embodiments, the model corrector 110 finds the average confidence value across the records in the test data and uses that as the non-perturbation confidence value for the classification model.

In certain embodiments, the model corrector 110 computes the average distance travelled by the classes to compute the confidence value (which indicates fairness) of the classification model. In certain embodiments, the model corrector 110 the direction of the change in confidence values is used to identify the fairness of the classification model. In certain embodiments, the model corrector 110 finds the difference in confidence values and the fairness threshold to compute the non-perturbation based fairness based on confidence values.

Figure 13:
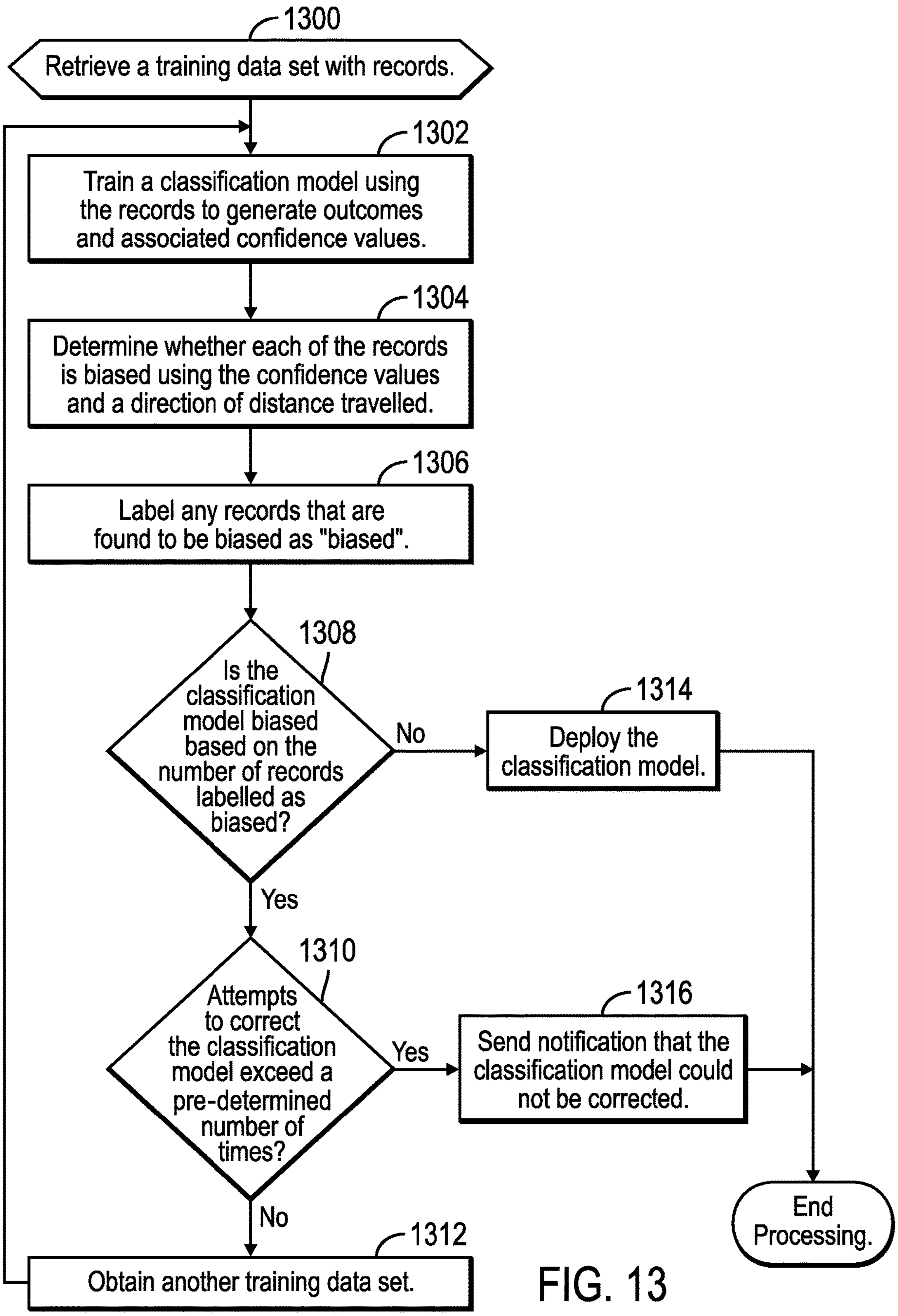
FIG. 13 illustrates, in a flowchart, operations for correcting a classification model in accordance with certain embodiments.

FIG. 13 illustrates, in a flowchart, operations for correcting a classification model in accordance with certain embodiments. Control begins at block 1300 with the model corrector 110 retrieving a training data set with records. In block 1302, the model corrector 110 trains the classification model using the records to generate outcomes and associated confidence values. In particular, the classification model generates a class of the outcome, and a confidence value is associated with that class. In block 1304, the model corrector 110 determines whether each of the records is biased using the confidence values and a direction of distance travelled. With embodiments, the direction of distance travelled indicates whether to treat a confidence change (absolute difference of confidence values) as positive or negative. In particular, if direction of distance traveled increases bias, the confidence change is treated as positive, and, if the direction of distance traveled decreases bias, the confidence change is treated as negative.

In block 1306, the model corrector 110 labels any records that are found to be biased as "biased". In block 1308, the model corrector 110 determines whether the classification model is biased based on the number of records labelled as biased. If so, processing continues to block 1310, otherwise, processing continues to block 1314. In certain embodiments, the model corrector 110 determines that the classification model is biased based on the number of records labelled biased exceeding a model bias threshold. In certain embodiments, the model corrector 110 determines that the classification model is not biased based on the number of records labelled biased being equal to or below the model bias threshold. The model bias threshold may be modified (e.g., by a system administrator). A classification model that is biased is considered to be not fair, while a classification model that is not biased is considered to be fair.

In block 1310, the model corrector 110 determines whether attempts to correct the classification model exceed a pre-determined number of times. If so, processing continues to block 1316, otherwise, processing continues to block 1312.

In block 1312, the model corrector 110 obtains another training data set, and processing continues to block 1302 to re-train the classification model. The training set obtained in block 1312, includes the records labelled as biased and may, optionally, include the other records from the previous training set that are not labelled as biased and/or may include new records not already used to train the classification model.

In block 1314, the model corrector 110 deploys the classification model and processing ends.

In block 1316, the model corrector 110 sends notification that the classification model could not be corrected (e.g., to a system administrator) and processing ends.

Figure 14:
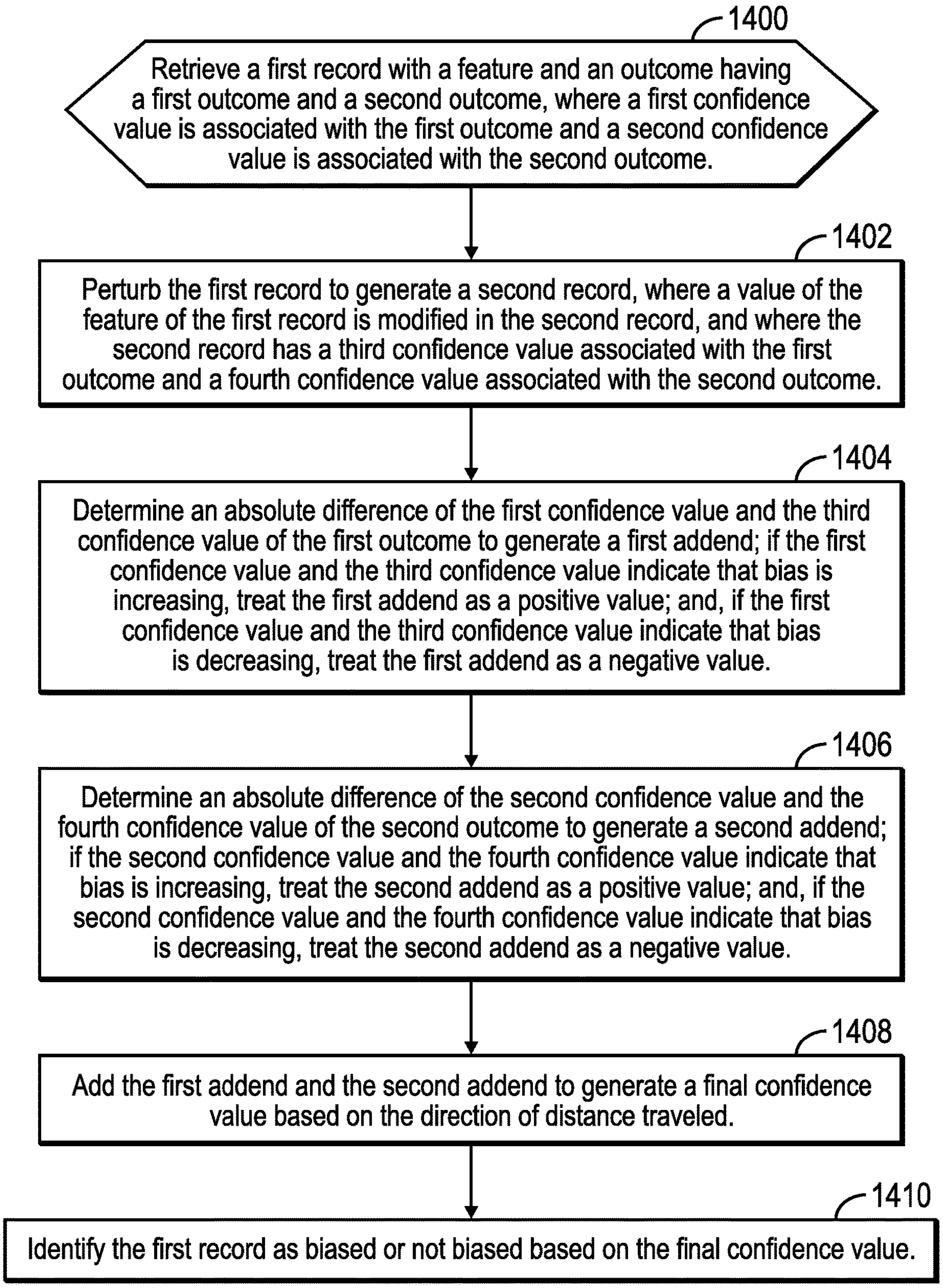
FIG. 14 illustrates, in a flowchart, operations for determining a final confidence value for a classification model in accordance with certain embodiments.

FIG. 14 illustrates, in a flowchart, operations for determining a final confidence value for a classification model in accordance with certain embodiments. Control begins at block 1400 with the model corrector 110 retrieving a first record (an "original" record) with a feature and an outcome having a first outcome (i.e., a first class) and a second outcome (i.e., a second class), where a first confidence value is associated with the first outcome and a second confidence value is associated with the second outcome.

In block 1402, the model corrector 110 perturbs the first record to generate a second record (a "perturbed" record), where a value of the feature of the first record is modified in the second record, and where the second record has a third confidence value associated with the first outcome and a fourth confidence value associated with the second outcome.

In block 1404, the model corrector 110 determines an absolute difference of the first confidence value and the third confidence value of the first outcome to generate a first addend; if the first confidence value and the third confidence value indicate that bias is increasing, treat the first addend as a positive vale; and, if the first confidence value and the third confidence value indicate that bias is decreasing, treat the first addend as a negative value.

In block 1406, the model corrector 110 determines an absolute difference of the second confidence value and the fourth confidence value of the second outcome to generate a second addend; if the second confidence value and the fourth confidence value indicate that bias is increasing, treat the second addend as a positive vale; and, if the second confidence value and the fourth confidence value indicate that bias is decreasing, treat the second addend as a negative value.

In block 1408, the model corrector 110 adds the first addend and the second addend to generate a final confidence value based on the direction of distance traveled.

In block 1410, the model corrector 110 identifies the record as biased or not biased based on the final confidence value. In certain embodiments, the model corrector 110 identifies the record as not biased if the final confidence value exceeds a record confidence threshold. In such embodiments, the model corrector 110 identifies the record as biased if the final confidence value is equal to or below the record confidence threshold. The record confidence threshold may be modified (e.g., by a system administrator). In additional embodiments, the model corrector 100 identifies the record as not biased (i.e., fair) if the final confidence value is negative.

In certain embodiments, the processing of FIG. 14 is performed for each record in the training data set used to train the classification model.

The first addend and the second addend may also be referred to as confidence changes.

In certain embodiments for each original record and each perturbed record, the model corrector 110 determines a confidence change between the original record and the perturbed record for a class; in response to determining that bias is increasing, the model corrector 110 treats the confidence change as a positive value; and, in response to determining that the bias is decreasing, the model corrector 110 treats the confidence change as a negative value.

In certain embodiments, the original record is determined to be biased when the final confidence value is equal to or below a record confidence threshold. In certain embodiments, the classification model is determined to be biased when a number of the original records exceeds a model bias threshold.

In certain embodiments, in response to determining whether the original record is biased, the model corrector 110 labels the original record as biased.

In certain embodiments, the model corrector 110 re-trains the classification model using each original record labelled as biased.

In certain embodiments, the model corrector 110 determines a fairness for a classification model by obtaining, for each record of a data set and each record of a perturbed data set corresponding to the data set, a predicted outcome of the classification model and a corresponding confidence value for each class of two or more classes. The model corrector 110 calculates a sum of distance travelled for the corresponding confidence value by the classes from the data set to the perturbed data set. The model corrector 110 determines the fairness for the classification model based on the sum.

In certain embodiments, calculating the sum includes determining a sign of each distance travelled for the corresponding confidence value by each class based on a direction of a change in the confidence value for each class and whether the class is favorable or unfavorable.

In certain embodiments, the classification model is a binary classification model (with two classes). In certain other embodiments, the classification model is a multi-class classification model (with more than two classes).

With embodiments of a binary classification model, the model corrector 110 obtains, for each record of a data set and each record of a perturbed data set corresponding to the data set, a predicted outcome of the binary classification model and a corresponding confidence value for each of two classes. The model corrector 110 calculates a sum of difference in the corresponding confidence value between the two classes over the data set and the perturbed data set, where a sign of the difference for the perturbed data set is determined based on the predicted outcome of the binary classification model. The model corrector 110 determines the fairness for the classification model based on the sum.

With embodiments, the model corrector 110 makes use of the confidence values to find the change in confidence values and use that to compute the fairness of the classification model.

Figure 15:
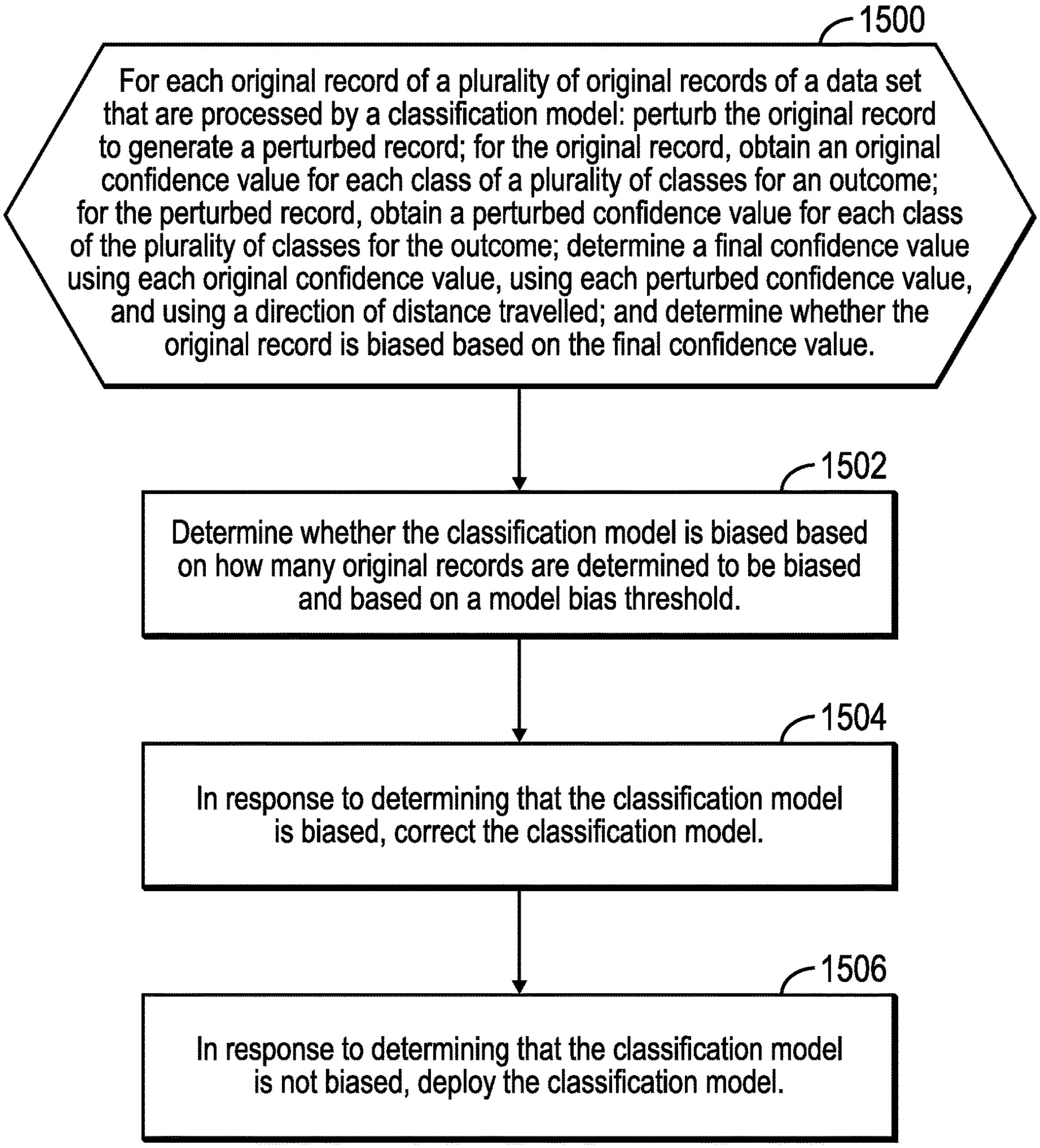
FIG. 15 illustrates, in a flowchart, operations for determining fairness of a model and correcting the classification model in accordance with certain embodiments.

FIG. 15 illustrates, in a flowchart, operations for determining fairness of a model and correcting the classification model in accordance with certain embodiments. Control begins at block 1500 with the model corrector 110, for each original record of a plurality of original records of a data set that are processed by a classification model: perturbing the original record to generate a perturbed record; for the original record, obtaining an original confidence value for each class of a plurality of classes for an outcome; for the perturbed record, obtaining a perturbed confidence value for each class of the plurality of classes for the outcome; determining a final confidence value using each original confidence value, using each perturbed confidence value, and using a direction of distance travelled; and determining whether the original record is biased based on the final confidence value.

In block 1502, the model corrector 110 determines whether the classification model is biased based on how many original records are determined to be biased and based on a model bias threshold. In block 1504, in response to determining that the classification model is biased, the model corrector 110 corrects the classification model. In block 1506, in response to determining that the classification model is not biased, the model corrector 110 deploys the classification model.

In certain embodiments, for each original record of a plurality of original records of a data set, the model corrector 110: perturbs the original record to generate a perturbed record; for the original record, obtains an original outcome, using a classification model, and obtains an original confidence value for each class of a plurality of classes; for the perturbed record, obtains a perturbed outcome, using the classification model, and obtains a perturbed confidence value for each class of the plurality of classes; determines a final confidence value using each original confidence value, using each perturbed confidence value, and using a direction of distance travelled; and determines whether the original record is biased based on the final confidence value and based on a record confidence threshold. Then, the model corrector 110 determines whether the classification model is biased based on how many original records are determined to be biased and based on a model bias threshold.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 16:
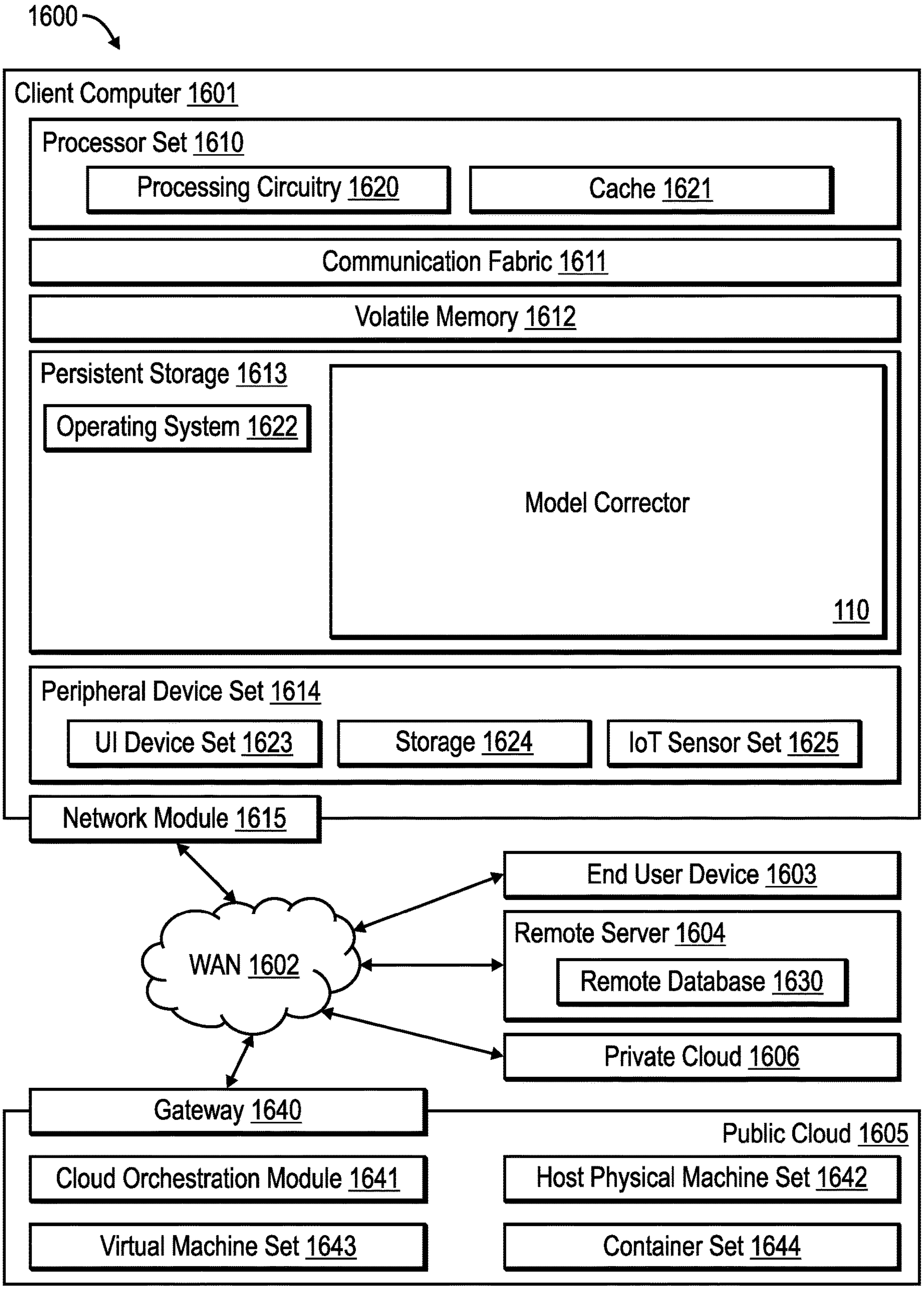
FIG. 16 illustrates a computing environment in accordance with certain embodiments.

FIG. 16 illustrates a computing environment 1600 in accordance with certain embodiments. Computing environment 1600 contains an example of an environment for the execution of at least some of the computer code involved in performing the inventive methods, such as code for the model corrector 110. In addition to block 110, computing environment 1600 includes, for example, computer 1601, wide area network (WAN) 1602, end user device (EUD) 1603, remote server 1604, public cloud 1605, and private cloud 1606. In this embodiment, computer 1601 includes processor set 1610 (including processing circuitry 1620 and cache 1621), communication fabric 1611, volatile memory 1612, persistent storage 1613 (including operating system 1622 and block 110, as identified above), peripheral device set 1614 (including user interface (UI) device set 1623, storage 1624, and Internet of Things (IOT) sensor set 1625), and network module 1615. Remote server 1604 includes remote database 1630. Public cloud 1605 includes gateway 1640, cloud orchestration module 1641, host physical machine set 1642, virtual machine set 1643, and container set 1644.

COMPUTER 1601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1630. As is well understood in the art of computer technology, and depending upon the technology, performance of a computer-implemented method may be distributed among multiple computers and/or between multiple locations. On the other hand, in this presentation of computing environment 1600, detailed discussion is focused on a single computer, specifically computer 1601, to keep the presentation as simple as possible. Computer 1601 may be located in a cloud, even though it is not shown in a cloud in FIG. 16. On the other hand, computer 1601 is not required to be in a cloud except to any extent as may be affirmatively indicated.

PROCESSOR SET 1610 includes one, or more, computer processors of any type now known or to be developed in the future. Processing circuitry 1620 may be distributed over multiple packages, for example, multiple, coordinated integrated circuit chips. Processing circuitry 1620 may implement multiple processor threads and/or multiple processor cores. Cache 1621 is memory that is located in the processor chip package(s) and is typically used for data or code that should be available for rapid access by the threads or cores running on processor set 1610. Cache memories are typically organized into multiple levels depending upon relative proximity to the processing circuitry. Alternatively, some, or all, of the cache for the processor set may be located "off chip." In some computing environments, processor set 1610 may be designed for working with qubits and performing quantum computing.

Computer readable program instructions are typically loaded onto computer 1601 to cause a series of operational steps to be performed by processor set 1610 of computer 1601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1621 and the other storage media discussed below. The program instructions, and associated data, are accessed by processor set 1610 to control and direct performance of the inventive methods. In computing environment 1600, at least some of the instructions for performing the inventive methods may be stored in block 110 in persistent storage 1613.

COMMUNICATION FABRIC 1611 is the signal conduction path that allows the various components of computer 1601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1612 is any type of volatile memory now known or to be developed in the future. Examples include dynamic type random access memory (RAM) or static type RAM. Typically, volatile memory 1612 is characterized by random access, but this is not required unless affirmatively indicated. In computer 1601, the volatile memory 1612 is located in a single package and is internal to computer 1601, but, alternatively or additionally, the volatile memory may be distributed over multiple packages and/or located externally with respect to computer 1601.

PERSISTENT STORAGE 1613 is any form of non-volatile storage for computers that is now known or to be developed in the future. The non-volatility of this storage means that the stored data is maintained regardless of whether power is being supplied to computer 1601 and/or directly to persistent storage 1613. Persistent storage 1613 may be a read only memory (ROM), but typically at least a portion of the persistent storage allows writing of data, deletion of data and re-writing of data. Some familiar forms of persistent storage include magnetic disks and solid state storage devices. Operating system 1622 may take several forms, such as various known proprietary operating systems or open source Portable Operating System Interface-type operating systems that employ a kernel. The code included in block 110 typically includes at least some of the computer code involved in performing the inventive methods.

PERIPHERAL DEVICE SET 1614 includes the set of peripheral devices of computer 1601. Data communication connections between the peripheral devices and the other components of computer 1601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1623 may include components such as a display screen, speaker, microphone, wearable devices (such as goggles and smart watches), keyboard, mouse, printer, touchpad, game controllers, and haptic devices. Storage 1624 is external storage, such as an external hard drive, or insertable storage, such as an SD card. Storage 1624 may be persistent and/or volatile. In some embodiments, storage 1624 may take the form of a quantum computing storage device for storing data in the form of qubits. In embodiments where computer 1601 is required to have a large amount of storage (for example, where computer 1601 locally stores and manages a large database) then this storage may be provided by peripheral storage devices designed for storing very large amounts of data, such as a storage area network (SAN) that is shared by multiple, geographically distributed computers. IoT sensor set 1625 is made up of sensors that can be used in Internet of Things applications. For example, one sensor may be a thermometer and another sensor may be a motion detector.

NETWORK MODULE 1615 is the collection of computer software, hardware, and firmware that allows computer 1601 to communicate with other computers through WAN 1602. Network module 1615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1615 are performed on the same physical hardware device. In other embodiments (for example, embodiments that utilize software-defined networking (SDN)), the control functions and the forwarding functions of network module 1615 are performed on physically separate devices, such that the control functions manage several different network hardware devices. Computer readable program instructions for performing the inventive methods can typically be downloaded to computer 1601 from an external computer or external storage device through a network adapter card or network interface included in network module 1615.

WAN 1602 is any wide area network (for example, the internet) capable of communicating computer data over non-local distances by any technology for communicating computer data, now known or to be developed in the future. In some embodiments, the WAN 1602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1603 is any computer system that is used and controlled by an end user (for example, a customer of an enterprise that operates computer 1601), and may take any of the forms discussed above in connection with computer 1601. EUD 1603 typically receives helpful and useful data from the operations of computer 1601. For example, in a hypothetical case where computer 1601 is designed to provide a recommendation to an end user, this recommendation would typically be communicated from network module 1615 of computer 1601 through WAN 1602 to EUD 1603. In this way, EUD 1603 can display, or otherwise present, the recommendation to an end user. In some embodiments, EUD 1603 may be a client device, such as thin client, heavy client, mainframe computer, desktop computer and so on.

REMOTE SERVER 1604 is any computer system that serves at least some data and/or functionality to computer 1601. Remote server 1604 may be controlled and used by the same entity that operates computer 1601. Remote server 1604 represents the machine(s) that collect and store helpful and useful data for use by other computers, such as computer 1601. For example, in a hypothetical case where computer 1601 is designed and programmed to provide a recommendation based on historical data, then this historical data may be provided to computer 1601 from remote database 1630 of remote server 1604.

PUBLIC CLOUD 1605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1605 is performed by the computer hardware and/or software of cloud orchestration module 1641. The computing resources provided by public cloud 1605 are typically implemented by virtual computing environments that run on various computers making up the computers of host physical machine set 1642, which is the universe of physical computers in and/or available to public cloud 1605. The virtual computing environments (VCEs) typically take the form of virtual machines from virtual machine set 1643 and/or containers from container set 1644. It is understood that these VCEs may be stored as images and may be transferred among and between the various physical machine hosts, either as images or after instantiation of the VCE. Cloud orchestration module 1641 manages the transfer and storage of images, deploys new instantiations of VCEs and manages active instantiations of VCE deployments. Gateway 1640 is the collection of computer software, hardware, and firmware that allows public cloud 1605 to communicate through WAN 1602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1606 is similar to public cloud 1605, except that the computing resources are only available for use by a single enterprise. While private cloud 1606 is depicted as being in communication with WAN 1602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1605 and private cloud 1606 are both part of a larger hybrid cloud.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

EXAMPLES

The foregoing description provides examples of embodiments of the invention, and variations and substitutions may be made in other embodiments. Several examples will now be provided to further clarify various aspects of the present disclosure:

Example 1: A computer-implemented method comprises, for each original record of a plurality of original records of a data set: perturbing the original record to generate a perturbed record; for the original record, obtaining an original outcome, using a classification model, and an original confidence value for each class of a plurality of classes; for the perturbed record, obtaining a perturbed outcome, using the classification model, and a perturbed confidence value for each class of the plurality of classes; determining a final confidence value using each original confidence value, each perturbed confidence value, and a direction of distance travelled; and determining whether the original record is biased based on the final confidence value. The computer-implemented method further comprises determining whether the classification model is biased based on how many original records are determined to be biased. The computer-implemented method further comprises, in response to determining that the classification model is biased, correcting the classification model. The computer-implemented method further comprises, in response to determining that the classification model is not biased, deploying the classification model.

Example 2: The limitations of any of Examples 1 and 3-7, wherein the computer-implemented method further comprises, for each original record and each perturbed record, determining a confidence change between the original record and the perturbed record for a class; in response to determining that bias is increasing, treating the confidence change as a positive value; and, in response to determining that the bias is decreasing, treating the confidence change as a negative value.

Example 3: The limitations of any of Examples 1-2 and 4-7, wherein the original record is determined to be biased when the final confidence value is equal to or below a record confidence threshold.

Example 4: The limitations of any of Examples 1-3 and 5-7, wherein the classification model is determined to be biased when a number of the original records exceeds a model bias threshold.

Example 5: The limitations of any of Examples 1~4 and 6-7, wherein the computer-implemented method further comprises, in response to determining whether the original record is biased, labelling the original record as biased.

Example 6: The limitations of any of Examples 1-5 and 7, wherein the computer-implemented method further comprises re-training the classification model using each original record labelled as biased.

Example 7: The limitations of any of Examples 1-6, wherein the classification model is one of a binary classification model and a multi-class classification model.

Example 8: A computer program product, the computer program product comprising a computer readable storage medium having program code embodied therewith, the program code executable by at least one processor to perform a method according to any one of Examples 1-7.

Example 9: A computer system comprising one or more processors, one or more computer-readable memories and one or more computer-readable, tangible storage devices, and program instructions, stored on at least one of the one or more computer-readable, tangible storage devices for execution by at least one of the one or more processors via at least one of the one or more computer-readable memories, to perform a method according to any of Examples 1-7.

What is claimed is:

1. A computer-implemented method, comprising:

for each original record of a plurality of original records of a training data set that are processed by a classification model:

perturbing the original record to generate a perturbed record;

obtaining, for the original record, original confidence values for each class of a plurality of classes for an outcome generated by the classification model, wherein:

a first class of the plurality of classes has a first confidence value of the original confidence values, and a second class of the plurality of classes has a second confidence value of the original confidence values;

obtaining, for the perturbed record, perturbed confidence values for each class of the plurality of classes for the outcome generated by the classification model, wherein:

the first class has a third confidence value of the perturbed confidence values, and the second class has a fourth confidence value of the perturbed confidence values;

determining a first confidence change comprising an absolute difference of the first confidence value and the third confidence value;

determining a second confidence change comprising an absolute difference of the second confidence value and the fourth confidence value;

determining, based on a direction of distance travelled, a final confidence value by adding the first confidence change and the second confidence change;

in response to determining that the original record is biased based on the final confidence value, labelling the original record as biased;

determining that the classification model is biased based on how many original records are determined to be biased;

re-training the classification model using each original record, of the plurality of original records, labelled as biased; and deploying the re-trained classification model to predict new outcomes.

2. The computer-implemented method of claim 1, further comprising:

treating the first confidence change as a positive value, based on determining that bias of the original record is increasing; and treating the first confidence change as a negative value, based on determining that the bias of the original record is decreasing.

3. The computer-implemented method of claim 1, wherein the determining that the original record is biased in a case where the final confidence value is equal to or below a record confidence threshold.

4. The computer-implemented method of claim 1, wherein the determining that the classification model is biased in a case where a number of the plurality of original records exceeds a model bias threshold.

5. The computer-implemented method of claim 1, wherein the classification model is one of a binary classification model and a multi-class classification model.

6. The computer-implemented method of claim 1, wherein the classification model is re-trained a plurality of times.

7. The computer-implemented method of claim 1, wherein the classification model is re-trained using each original record of the plurality of original records labelled as biased and additional unlabelled records from a different training data set.

8. A computer program product, the computer program product comprising a computer readable storage medium having program code embodied therewith, the program code executable by at least one processor to perform operations:

for each original record of a plurality of original records of a training data set that are processed by a classification model:

perturbing the original record to generate a perturbed record;

obtaining, for the original record, an original confidence values for each class of a plurality of classes for an outcome generated by the classification model, wherein:

a first class of the plurality of classes has a first confidence value of the original confidence values, and a second class of the plurality of classes has a second confidence value of the original confidence values;

obtaining, for the perturbed record, a perturbed confidence values for each class of the plurality of classes for the outcome generated by the classification model, wherein:

the first class has a third confidence value of the perturbed confidence values, and the second class has a fourth confidence value of the perturbed confidence values;

determining a first confidence change comprising an absolute difference of the first confidence value and the third confidence value;

determining a second confidence change comprising an absolute difference of the second confidence value and the fourth confidence value;

determining, based on a direction of distance travelled, a final confidence value by adding the first confidence change and the second confidence change;

in response to determining that the original record is biased based on the final confidence value, labelling the original record as biased;

determining that the classification model is biased based on how many original records are determined to be biased;

re-training the classification model using each original record, of the plurality of original records, labelled as biased; and deploying the re-trained classification model to predict new outcomes.

9. The computer program product of claim 8, wherein the program code is executable by the at least one processor to further perform the operations:

treating the first confidence change as a positive value, based on determining that bias of the original record is increasing; and treating the first confidence change as a negative value, based on determining that the bias of the original record is decreasing.

10. The computer program product of claim 8, wherein the original record is determined to be not biased in a case where the final confidence value exceeds a record confidence threshold.

11. The computer program product of claim 8, wherein the determining that the classification model is biased in a case where a number of the plurality of original records exceeds a model bias threshold.

12. The computer program product of claim 8, wherein the classification model is one of a binary classification model and a multi-class classification model.

13. The computer program product of claim 8, wherein the classification model is re-trained a plurality of times.

14. The computer program product of claim 8, wherein the classification model is re-trained using each original record of the plurality of original records labelled as biased and additional unlabelled records from a different training data set.

15. A computer system, comprising:

one or more processors, one or more computer-readable memories and one or more computer-readable, tangible storage devices; and program instructions, stored on at least one of the one or more computer-readable, tangible storage devices for execution by of the one or more processors via the one or more computer-readable memories, to perform operations comprising:

for each original record of a plurality of original records of a training data set that are processed by a classification model:

perturbing the original record to generate a perturbed record;

obtaining, for the original record, an original confidence values for each class of a plurality of classes for an outcome generated by the classification model, wherein:

a first class of the plurality of classes has a first confidence value of the original confidence values, and a second class of the plurality of classes has a second confidence value of the original confidence values;

obtaining, for the perturbed record, perturbed confidence values for each class of the plurality of classes for the outcome generated by the classification model, wherein:

the first class has a third confidence value of the perturbed confidence values, and the second class has a fourth confidence value of the perturbed confidence values;

determining a first confidence change comprising an absolute difference of the first confidence value and the third confidence value;

determining a second confidence change comprising an absolute difference of the second confidence value and the fourth confidence value;

determining, based on a direction of distance travelled, a final confidence value by adding the first confidence change and the second confidence change;

in response to determining that the original record is biased based on the final confidence value, labelling the original record as biased;

determining that the classification model is biased based on how many original records are determined to be biased;

re-training the classification model using each original record of the plurality of original records labelled as biased; and deploying the re-trained classification model to predict new outcomes.

16. The computer system of claim 15, wherein the operations further comprise:

treating the first confidence change as a positive value, based on determining that bias of the original record is increasing; and treating the first confidence change as a negative value, based on determining that the bias of the original record is decreasing.

17. The computer system of claim 15, wherein the original record is determined to be not biased in a case where the final confidence value exceeds a record confidence threshold.

18. The computer system of claim 15, wherein the determining that the classification model is biased in a case where a number of the plurality of original records exceeds a model bias threshold.

19. The computer system of claim 15, wherein the classification model is re-trained a plurality of times.

20. The computer system of claim 15, wherein the classification model is re-trained using each original record of the plurality of original records labelled as biased and additional unlabelled records from a different training data set.

* * * * *